(12) United States Patent
Hao

(10) Patent No.: US 7,450,509 B2
(45) Date of Patent: *Nov. 11, 2008

(54) ADAPTIVE FLOW CONTROL METHOD AND APPARATUS

(75) Inventor: Yi-Hsien Hao, Saratoga, CA (US)

(73) Assignee: Broadcom Corporation, Irvine, CA (US)

(*) Notice: Subject to any disclaimer, the term of this patent is extended or adjusted under 35 U.S.C. 154(b) by 717 days.

This patent is subject to a terminal disclaimer.

(21) Appl. No.: 11/020,114

(22) Filed: Dec. 27, 2004

(65) Prior Publication Data

US 2005/0105469 A1    May 19, 2005

Related U.S. Application Data

(63) Continuation of application No. 10/090,844, filed on Mar. 6, 2002, now Pat. No. 6,851,008.

(51) Int. Cl.
G01R 31/08 (2006.01)
G06F 11/00 (2006.01)
G06F 13/14 (2006.01)
G06F 3/00 (2006.01)
G06F 5/00 (2006.01)
G08C 15/00 (2006.01)
H04J 1/16 (2006.01)
H04J 3/14 (2006.01)
H04L 1/00 (2006.01)
H04L 12/26 (2006.01)

(52) U.S. Cl. .................. 370/234; 710/305; 710/15; 710/57

(58) Field of Classification Search .............. 370/229, 370/235, 465, 468, 470–473
See application file for complete search history.

(56) References Cited

U.S. PATENT DOCUMENTS 5,579,301 A    11/1996    Ganson et al.
5,987,507 A    11/1999    Creedon et al.

(Continued)

FOREIGN PATENT DOCUMENTS

EP    465090    1/1992

(Continued)

OTHER PUBLICATIONS

"Computer Networks," A.S. Tanenbaum, Prentice-Hall Int., USA, XP-002147300(1998), Sec. 5.2-Sec. 5.3, pp. 309-320.

Primary Examiner—Seema S. Rao
Assistant Examiner—Jianye Wu
(74) Attorney, Agent, or Firm—Squire, Sanders & Dempsey L.L.P.

(57) ABSTRACT

The present invention provides a method of controlling data flow within a network device. The method includes the steps of snooping a data packet before the data packet is stored in a memory buffer of the network device to determine a packet size, aggregating the packet size to generate a total number of data packets within a burst if the packet size exceeds a predetermined packet size. The method also includes the steps of lowering a threshold of the memory buffer to a reset threshold if the total number of data packets exceeds a predetermined number of consecutive data packets and activating a pause frame based upon the reset threshold to temporarily suspend transmission of incoming data packets to the network device.

24 Claims, 5 Drawing Sheets

U.S. PATENT DOCUMENTS

| | | | |
|---|---|---|---|
| 5,991,304 A | 11/1999 | Abramson | |
| 6,031,821 A * | 2/2000 | Kalkunte et al. | 370/235 |
| 6,115,356 A | 9/2000 | Kalkunte et al. | |
| 6,167,029 A | 12/2000 | Ramakrishnan | |
| 6,295,281 B1 | 9/2001 | Itkokwsky et al. | |
| 6,393,028 B1 | 5/2002 | Leung | |
| 6,405,258 B1 * | 6/2002 | Erimli et al. | 709/235 |
| 6,553,027 B1 * | 4/2003 | Lam et al. | 370/386 |
| 6,683,889 B1 * | 1/2004 | Shaffer et al. | 370/516 |
| 6,851,008 B2 * | 2/2005 | Hao | 710/305 |
| 7,215,637 B1 * | 5/2007 | Ferguson et al. | 370/230.1 |
| 2005/0105469 A1 * | 5/2005 | Hao | 370/235 |

FOREIGN PATENT DOCUMENTS

| | | |
|---|---|---|
| EP | 853441 | 7/1998 |
| EP | 859492 | 8/1998 |
| FR | 2725575 | 4/1996 |
| WO | 98/09473 | 3/1998 |

\* cited by examiner

INDIVIDUAL PORT THRESHOLD MODE

NORMAL OPERATING CONDITIONS

ADAPTIVE FLOW CONTROL METHOD AND APPARATUS

REFERENCE TO RELATED APPLICATIONS

This is a Continuation of application Ser. No. 10/090,844, filed Mar. 6, 2002 now U.S. Pat. No. 6,851,008. The disclosure of the prior application is hereby incorporated by reference herein in its entirety.

BACKGROUND OF THE INVENTION

1. Field of the Invention

The invention relates to a system and method for managing and controlling data flow within a network device, such as a multiple-linked or multiple-stacked chip device.

2. Description of the Related Art

Numerous types of flow control techniques and mechanisms have been devised for data packet transmission systems. Such control mechanisms typically regulate a source's operation with respect to the transmission of data into a network and are typically implemented in the operating system and in the network protocol software. For example, if a source attempts to send a large quantity of data to a destination device or network, and the destination device is overloaded, the destination software buffers store the data that cannot be transmitted and attempts to deliver the data that can be transmitted. Namely, when the destination device becomes congested, the destination device may use at least one of a variety of mechanism, such as dropping incoming data packets or sending out a pause frame signal to the source to suspend the transmission of the data. When there is no more buffer space available, the operating system typically suspends transmission of data space becomes available. The network protocol may also slow down the transmission of data from the source because the receiving application cannot keep up with the transmission rate of the data flow. These types of control mechanisms are known as flow control mechanisms.

Congestion may be generated when multiple consecutive bursts containing large data packets are received into the destination device. Congestion in a destination device, such as a chip or a switch, can occur at an input port or at an output port. In a multiple-linked or multiple-stacked chip configurations where there are several chips linked or stacked together, respectively, through expansion ports, i.e. link ports, congestion may be generated due to the data packets received in an input port (local port) connected to an external device, the expansion port or both. A burst is a continuous transfer of data from the source network to the destination device without any interruptions, which contains numerous large data packets that are received consecutively into one of the chips of the destination device. When several consecutive bursts are received containing a large number of data packets, the receiving chip or chips may be unable to respond fast enough to handle the large volume of incoming data packets. Namely, the receiving chip may be unable to process and transmit the data out of the destination device before the burst is received into the destination device. Therefore, the buffers of the receiving chip of the destination device will begin to fill-up with the incoming data packets and become saturated with the data packets. Once the buffers become saturated and the output ports of the buffers are congested, the destination device will begin to drop the remaining incoming data packets.

When the traffic of the incoming data packets exceeds the nominal capacity of the destination device, throughput degradation results. Throughput efficiency represents the ability of a network device to handle the offered load. For instance, if the network traffic is bursty and is directed to a single input of a destination device, the memory buffer of the destination device may overflow, which results in a loss of throughput and packet loss. Flow control mechanism have been developed by which the congested destination device limits access to the network by placing thresholds on the memory buffer, modifying the transmission rates, or shutting down the sending source for a prescribed amount of time. Flow control techniques are implemented within a system to throttle the source traffic for a specified period of time so that the congestion eases. One such flow control technique is a pause frame, which pauses the transmission of frames being transmitted from the input source to the destination device. The amount of pause time specified in the pause frame should be such that the congestion is expected to ease during that time. If the pause frame time is too large, then starvation of the network may occur. If the pause frame time is too low, then additional pause frames may need to be sent. However, sending too many pause frames may adversely affect the throughput of the destination device. Another flow control technique is the selection of the threshold, which triggers a pause frame. The threshold values should be selected so that such additional frames can be received without dropping the incoming data packets, since the initiation and transmission of a pause frame may take some time for the system to implement.

Therefore, what is needed is a novel method of providing a level of assurance to the network that the network's Quality of Service (QoS) can be satisfied. A QoS guarantee warrants the timely delivery of information on networks, control bandwidth, set priorities for selected traffic, and provide a good level of security. QoS is usually associated with being able to deliver time-sensitive information such as live video and voice while still maintaining enough bandwidth to deliver other traffic, albeit at a lower transmission rate. Managing the QoS within a network usually requires managing and controlling the data flow from the source network and within the destination device so that the incoming data packets are not dropped during transmission.

SUMMARY OF THE INVENTION

According to one embodiment, the present invention provides a method of controlling the data flow within a network device. The method includes the step of snooping a data packet before the data packet is stored in a memory buffer of the network device to determine a packet size and aggregating the packet size to generate a total number of data packets within a burst if the packet size exceeds a predetermined packet size. The method also includes the steps of lowering a threshold of the memory buffer to a reset threshold if the total number of data packets exceeds a predetermined number of consecutive data packets and activating a pause frame based upon the reset threshold to temporarily suspend transmission of incoming data packets to the network device.

Another embodiment of the invention is drawn to a device for controlling the data flow within a network device. The device includes a snooping module, a counter, a threshold lowering module and a pause activation module. The snooping module is contained within the network device and is configured to snoop a data packet before the data packet is stored in a memory buffer of the network device to determine a packet size of the data packet. The counter is included within the snooping module so that the counter adds the packet size to generate a total number of data packets within a burst if the packet size exceeds a predetermined packet size. The threshold lowering module is connected to receive instructions from the snooping module and is configured to lower a threshold of the memory buffer to a reset threshold if the total number of data packets exceeds a predetermined number of consecutive data packets. The pause activation module is connected to receive instructions from the threshold lowering module in order to trigger a pause frame based upon the reset threshold to temporarily suspend transmission of incoming data packets to the network device.

An alternate embodiment of the invention may include a device for controlling data flow within a network device. The device includes a snooping means, an aggregating means, a threshold reset means, and a pause frame activation means. The snooping means is contained within the network device for snooping a data packet before the data packet is stored in a memory buffer of the network device to determine a packet size. The aggregating means is included within the snooping module for aggregating the packet to generate a total number of data packets within a burst if the packet size exceeds a predetermined packet size. The threshold reset means is connected to receive instructions from the snooping module for lowering a threshold of the memory buffer to a reset threshold if the total number of data packets exceeds a predetermined number of consecutive data packets. The pause frame activation means is connected to receive instructions from the threshold lowering module for activating a pause frame based upon the reset threshold to temporarily suspend transmission of incoming data packets to the network device.

According to another embodiment, the network device may be a multiple-linked chip device that is capable of snooping simultaneously the data packet received at both an input port and an expansion port.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

Figure 1:
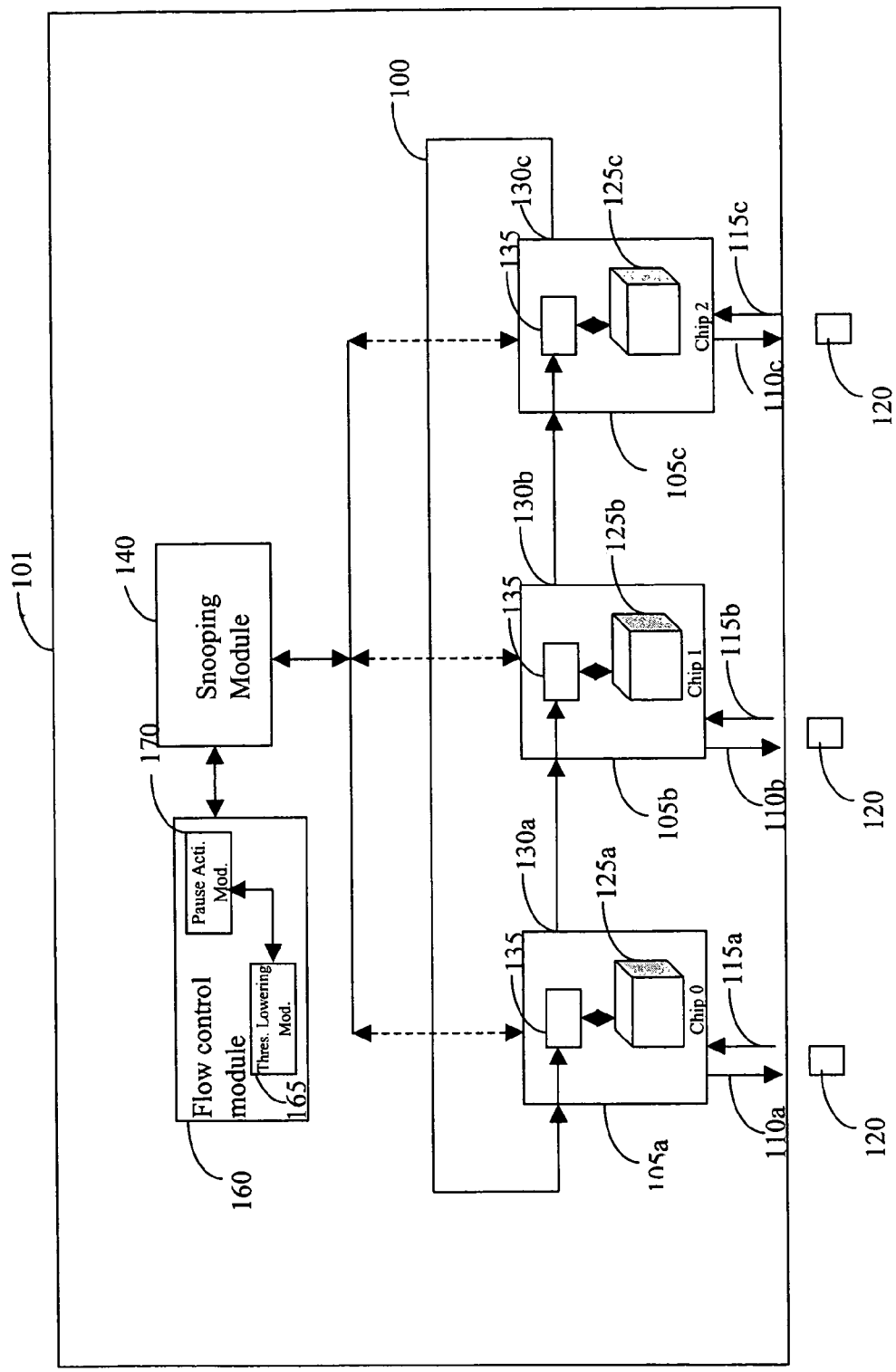
FIG. 1 is a simplified diagram of a multiple-linked chip device according to one embodiment of the invention.

FIG. 1 depicts a simplified block diagram of an exemplary embodiment of a multiple-linked chip device 100, which could be, for example, stacked or cascaded network switches, utilizing a flow control scheme configured to control the throughput of the flow of the data packets, which may be employed in the invention. FIG. 1 illustrates a three-chip configuration, which includes chip 105a, chip 105b, and chip 105c. However, FIG. 1 is merely an exemplar, other configurations, as understood by one skilled in the art, are within the scope of the invention. For example, the chips may be configured to include four, five or six chips connected in parallel or in series with each other or connected such that the configuration of the chips resemble a ring configuration or other geometric configuration, or any obvious variations thereof.

Each chip 105(a-c) includes an input port 110 for receiving a data packet in the multiple-linked chip device 100 from an external input source (not shown), and an output port 115 for transmitting the data packet out of the multiple-linked chip device 100 to a destination (not shown). The input ports 110 and output ports 115 of the multiple-linked chip device 100 may be coupled to one or more physical layers via respective interfaces and to a central processing unit (CPU) in order to route fixed-size data packets, i.e., cells, as well as variable-sized data packets. This configuration may enable the multiple-linked chip device 100 to control the exchange of a single data packet or a plurality of data packets 120 with any physical layers connected thereto. Various types of well-known products may be incorporated into the invention for performing data transmission-related functions at various levels of the OSI 7-layer reference model. For example, hubs or repeaters may operate at layer one, and essentially copy and "broadcast" incoming data to a plurality of spokes of the hub. Layer two switching-related devices are typically referred to as multiport bridges, and are capable of bridging two separate networks. Bridges may be incorporated into the invention to build a table of forwarding rules based upon which MAC (media access controller) addresses exist on which ports of the bridge, and may pass the data packets which are destined for an address which is located on an opposite side of the bridge. Bridges typically utilize what is known as the "spanning tree" algorithm to eliminate potential data loops; a data loop is a situation wherein a data packet endlessly loops in a network looking for a particular address. The spanning tree algorithm defines a protocol for preventing data loops. Layer three switches, sometimes referred to as routers, may be employed to forward the data packets based upon the destination device address. Layer three switches are capable of learning addresses and maintaining tables thereof which correspond to port mappings. Processing speed for layer three switches may utilize specialized high performance hardware, and off load the host CPU so that instruction decisions do not delay data packet forwarding.

As shown in FIG. 1, in order for the invention to regulate the influx of the data packets 120, a memory buffer 125 may be provided for buffering incoming data packets. The memory buffer 125 temporarily stores the incoming data packets 120 when the input source (not shown) sends the data packets 120 faster than the chip 105 can process the data packets 120. A register 135 may be associated with each chip 105. The register 135 may be, for example, a shift register which is a digital storage circuit in which the information of the data packet 120 is shifted from one flip-flop of a chain to the adjacent flip-flop on the application of each clock pulse so that the bits of the data packet 120 are moved either as single bits or as contiguous groups one or more positions to the right or left direction on a continuous basis.

Expansion ports 130 may be provided as an internal link port that connects the chips 105 with one another so that data packets 120 may be transferred amongst the chips 105. At the start of a transmission cycle, a data packet 120 transferred from an external input source (not shown) may enter the multiple-linked chip device 100 through any input port 110. Upon entering the multiple-linked chip device 100, the data packet 120 may use the expansion ports 130 as a conduit in which to travel amongst the chips 105 so that the data packet may be transferred to an external device connected to the output port 115 of a respective chip 105. In addition, each chip 105 may include two registers—one register for the input port 110 and the second register for the expansion port 130.

Thus, to efficiently manage the data flow of the system 101, the input port 110 and the expansion port 130 of each chip 105 must be monitored and controlled. Thus, the term "input source" may mean a device that transmits data packets which are received at the input port 110, the expansion port 130 or both the input port 110 and the expansion port 130. Since the chips 105 are connected, the data flow of one chip may adversely affect the data flow of one or more chips 105 within the multiple-linked chip device 100. For instance, chip 105b may receive a burst from an external device (input source) or an adjacent chip 105a so that the chip's memory buffer becomes saturated. If chip 105a attempts to transfer additional data packets 120 to chip 105b, then the transfer of the additional data packets from chip 105a to chip 105b may be delayed or the data packets 120 may be dropped if conventional devices are used.

However, in order to prevent the data packets from being dropped, which is a shortcoming of conventional devices, as discussed above, the present invention may employ a snooping module 140 to snoop the packets entering through both the input ports 110 and the expansion ports 130 to determine if a burst of consecutive large data packets will be transmitted into the chip's memory buffer. The snooping module 140 is capable of looking ahead before the data packet 120 enters the multiple-linked chip device 100 to determine whether successive large packets will be transferred into the multiple-linked chip device 100 in order to determine in advance whether the memory buffer 125 will be become saturated upon receiving the incoming data packets 120. In addition, the snooping module 140 is capable of determining whether consecutive packets received at either the input ports 110 or the expansion ports 130 will saturate the memory buffer 125. The snooping module 140 is also capable of determining whether successive large packets received simultaneously at both the input port and the expansion port will have an aggregate affect so that the memory buffer will become saturated.

If the snooping module 140 determines that the burst of incoming data packets 120 will most likely cause an overflow situation to occur, the snooping module 140 will instruct a flow control module 160 to lower the threshold (i.e., the watermark) of the memory buffer 125. As discussed above, the threshold activates a pause frame, which pauses the transmission of frames being transmitted from an input source to the chip. A threshold lowering module 165 may be included in the flow control module 160 for lowering the threshold of the memory buffer to the reset threshold. In addition, the flow control module 160 may include or be connected to a CPU (not shown) which operably connects to the system 101 to monitor and control the functions of the component of the system. A pause activation module 170 may also be included in the flow control module 160 for triggering a pause frame based upon the reset threshold to temporarily suspend transmission of incoming data packets to the network device. Namely, once the system 101 detects a potential overflow situation, the snooping module instructs the threshold lowering module 165 to lower the threshold for the memory buffer of the potentially affected chip or to lower the threshold for the memory buffer of all the chips within the system 101 to the RESET THRESHOLD. After the threshold has been lowered to the RESET THRESHOLD, the pause activation module 170 will instruct either the input port of the potentially affected chip or all the input ports of all the chips to send out a pause frame message to all of the sources to temporarily suspend the transmission of the data packets being transmitted from all of the sources to the system 101.

In a conventional device, a pause frame is activated so that the already congested memory buffer is given sufficient time to ease the congestion. However, in the present invention, the system 101 may lower the threshold before the burst reaches its destination device. However, the snooping scheme of the invention may depend upon the destination device to which the data packet is flowing. For example, the threshold can be lowered before the burst is received if the data packet is traveling from one chip to another chip. The amount of data packets currently contained in one chip may be measured as the incoming data packets traveling to another chip. Based upon the amount of data packets currently contained in one chip and traveling to another chip, the system 101 may lower the threshold in advance before the data packets reaches the other chip. However, if the data packets are being transmitted from a source external to a chip, the system can use the traffic flow of past data packets to predicate the flow of the incoming data packets and to lower the threshold in advance before the data packets enters the system. Thus, the system 101 takes a preemptive countermeasure to circumvent congestion of the memory buffer 125 from occurring. Therefore, the system 101 lowers the threshold by initiating a pause frame so that the memory buffer 125 of the chip 105 is given a sufficient amount of time to process the data packets 120 which are already stored in the memory buffer 125 before the burst is received. Since the invention prevents the input ports and the output ports of the memory buffer 125 from becoming congested, the invention provides adequate storage capacity within the memory buffer 125 in order to prevent the incoming data packets 120 from being dropped when received into the multiple-linked chip device 100.

The snooping module 140 can be programmed to determine if a predetermined number of consecutive large packets are being transmitted into the multiple-linked chip device 100. For instance, the snooping module 140 can be programmed to snoop for three, four or five consecutive large data packets within a single burst. The system 101 will then lower the threshold to activate a pause frame if the size of the incoming data packets and if the number of consecutive incoming packets exceeds a predetermined packet size. Alternatively or conjunctively, the system 101 may be programmed to snooping module 140 can be programmed to snoop for consecutive data packets having a predetermined transmission rate. Once, the consecutive number of data packets having the predetermined transmission rate is detected by the snooping module 140, the system 101 will then lower the threshold to activate a pause frame. However, if the snooping module 140 detects that a small data packet is being transmitted between two large data packets, the counter of the snooping module 140 will automatically be reset and the counter of the snooping module 140 begins to re-count the next set of incoming data packets to determine if the next incoming data packets satisfies the predetermined burst size on no requirement. Namely, the snooping module 140 may be set so that the lowering of the threshold is not activated until the counter of the snooping module 140 detects a burst having a predetermined number of data packets having a predetermined packet size.

In order to snoop the incoming data packets 120, the system 101 monitors the current traffic pattern of the flow of the data packets to predict the future data flow for each chip, the overall system or both. The system 101 may monitor the current traffic flow. For instance, if a predetermined number of consecutive data packets are received within the system 101, the snooping module 140 will use this information to predict, i.e., forecast, whether the receipt of additional data packets will cause the memory buffer to become saturated. Namely, the system 101 may use the information regarding the data packets already received at one chip to predict the future traffic flow of another chip or the overall system 101. For example, the current data flow detected at chip 130a may be used by the system 101 as the future flow data of chip 130b since the current data flow of chip 130a may eventually travel to chip 130b.

Figure 2A:
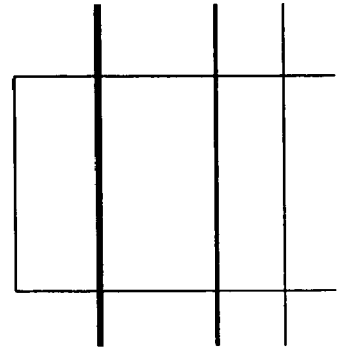
FIGS. 2A-2D depict the pause frame scheme according to one embodiment of the invention.
Figure 2B:
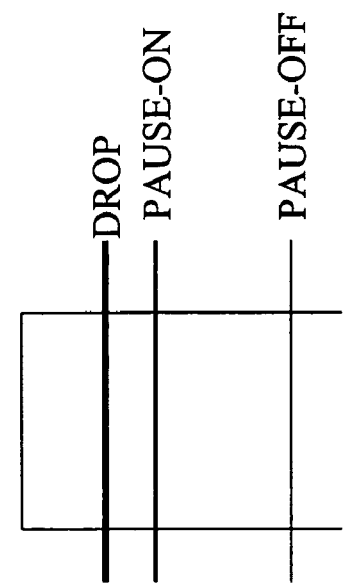

In FIG. 2A, the system 101 is preprogrammed to include a "PAUSE OFF" threshold, a "PAUSE ON" threshold and a "DROP" threshold. Under normal operating conditions, as long as the memory space used by the data packets 125 stored in the memory buffer 125 remains below the "PAUSE OFF" threshold, there is enough capacity within the memory buffer 125 to store the incoming data packets. However, when the contents of the memory buffer 125 exceeds the "PAUSE ON" threshold, a pause frame is activated. Furthermore, should the contents of the memory buffer 125 exceeds the "DROP" threshold, this means that the memory buffer is saturated and the system 101 will begin to drop the incoming data packets. However, as shown in FIG. 2B, when the snooping module 140 detects that a burst of incoming data packets meet or exceeds the predetermined number and/or data packet size, the system 101 will lower the "PAUSE ON" threshold of the memory data packet to the "PAUSE ON (RESET)" threshold. The "PAUSE ON (RESET)" threshold may be pre-programmed or may be dynamically adjusted depending upon the number of data packets currently stored within the memory buffer 125 which indicates the amount of memory used by the data. For example, the "PAUSE ON (RESET)" may be established so that the threshold of the memory buffer 125 is capable of handling the current capacity plus a determined number of incoming data packets since the initiation and transmission of the pause frame will take some time to be implemented. Upon exceeding the threshold of the "PAUSE ON (RESET)", the system 101 will generate a pause frame based on the programmed "PAUSE ON (RESET)." The pause frame is sent to the data terminal equipment (DTE) (not shown) of the source, which is the communication node of the source that is capable of the reception and/or transmission of data. The DTE will stop sending new frames for a time period as specified by the pause frame. After the PAUSE time has elapsed, the DTE will resume sending the incoming frames which may include the expected burst which contains the successive large data packets. Furthermore, when the pause frame is transmitted, the DTE may suspend transmission of incoming data packets to all the chips within the multiple-linked chip device or to only the chip which will receive the incoming burst.

Figures 2C, 2D:
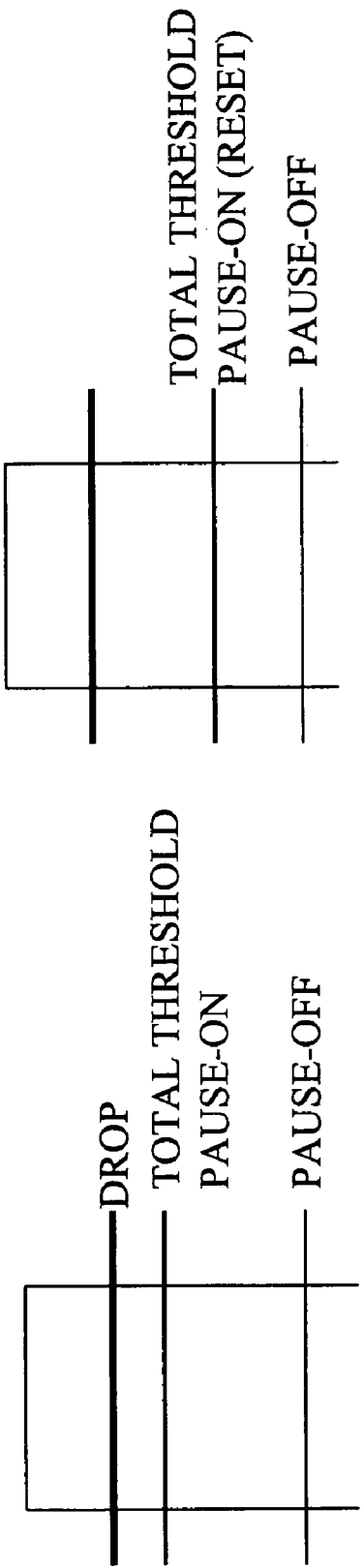

According to another embodiment, the invention may be programmed so that at least two thresholds are established in order to control the flow of the data packets. First, the invention may be programmed to control the individual threshold for each port within each chip. An individual port threshold may be established to control each individual port. Thus, each port may be programmed to have a different threshold. Second, the invention may be programmed to monitor and control the total threshold of the system 101. The total threshold may be established to aggregate the flow of the data packets received at all of the individual ports to determine a total flow of the system. The total flow of the system may be used to control all of the ports of the systems. If the invention is preprogrammed to monitor the individual port threshold, as shown for example in FIGS. 2A and 2B, the flow control measures may be applied only on to the specific ports which become congested or to specific ports which the system administrator has programmed the system to monitor. For example, in individual port threshold mode, if port two of Chip Two is determined to be congested and port three of Chip Three is not congested, transmissions of the data packets to Chip Two will be suspended, meanwhile the transmission of the data packets to Chip Three will still be permitted. However, if the total threshold mode is activated, once data entering the system at any port causes the system to exceed the total threshold, all of the ports will be reset to the TOTAL PAUSE ON (RESET) threshold, as shown in FIGS. 2C-2D. Once the data entering the system causes the TOTAL PAUSE ON (RESET) threshold for the entire system to be exceeded, then all the ports will issue a pause frame to all sources which are transmitting incoming data packets into the system 101.

Figure 3A:
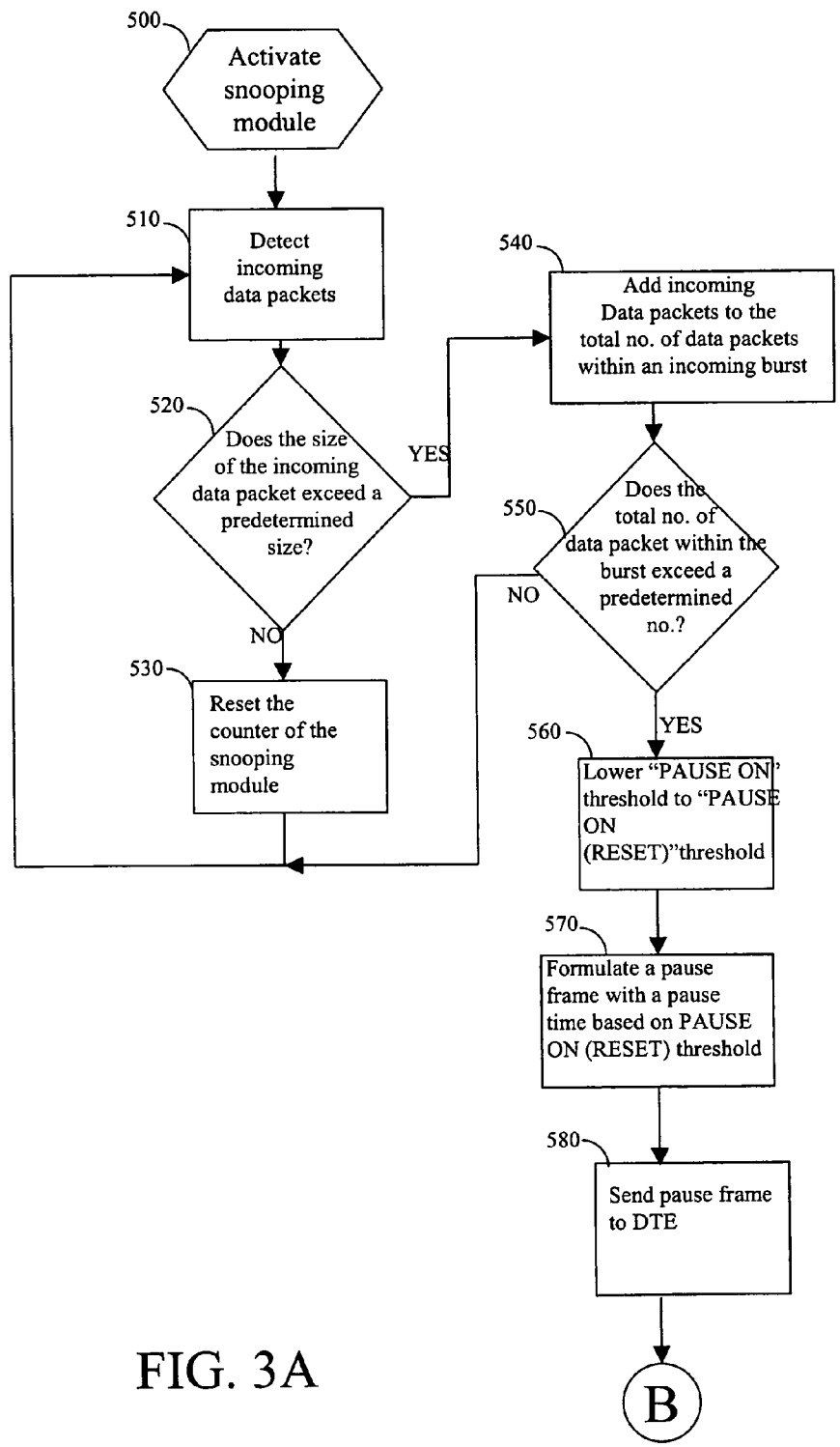
FIG. 3 is a flow chart illustrating one example of the method according to the invention.
Figure 3B:
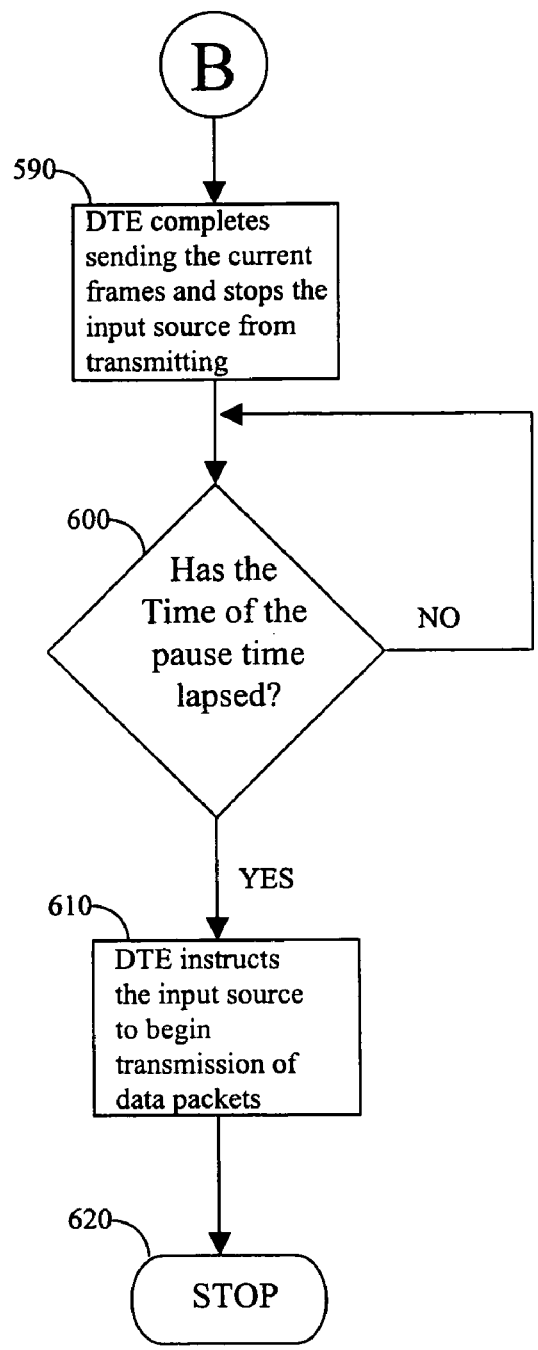

FIGS. 3A and 3B illustrate how the system may snoop the incoming data packets according to one embodiment of the invention. In step 500, the snooping module is activated. In step 510, the system detects the incoming packets. In step 520, the system determines whether the incoming data packet size exceeds a predetermined data packet size. If the response to step 520 is negative, this means that the incoming packet is a small data packet. Therefore, the system resets the counter of the snooping module in step 530 and returns to step 510 to detect the next incoming data packets. If the response in step 520 is positive, this indicates that the incoming data packet is a large data packet. Therefore, the system advances to step 540 and adds the incoming data packet to the total number of data packets within the burst. In step 550, the system determines whether the total number of data packets of the burst exceeds a predetermined number of consecutive data packets within the burst. If the response to step 550 is negative, the system returns to step 510 and detects the next incoming data packet. If the response to step 550 is positive, this indicates that the incoming data packets is a burst containing a large number of consecutive data packets that will cause the memory buffer to overflow. Thus, the system advances to step 560 and lowers the PAUSE ON threshold to the PAUSE ON (RESET) threshold.

At step 570, the system formulates a pause frame having a pause time based on the PAUSE ON (RESET) threshold. In step 580, the system sends the pause frame to the DTE. The DTE, in step 590, completes sending the current frames out of the system and instructs the input source to stop transmitting incoming data packets. During the pause period, the system continues to process the currently stored data packets and transfer these data packets out of the memory buffer. Also during the pause period, the system, in step 600, continues to check to determine if the memory buffer has had a sufficient amount of time to transfer out enough data packets out of the memory buffer in order to handle the incoming burst by checking to determine whether the pause time has lapsed. In step 610, the DTE instructs the input source to continue resending the data packets, including the burst containing the large number of consecutive data packets.

One implementation of the algorithm of the invention is as follows, as represented in Verilog Code:

If chip3 detected it is a three or four-chip system, and if exp_rxport detect the incoming frame "rate" (number of frames in one frame time) is larger than thresh value, lower the "total_thresh_pause_sz, total_thresh_hyst_sz" and "hund_thresh_pause_sz,hund_thresh_hyst_sz" and "ten_thresh_pause_sz, ten_thresh_hyst_sz."

Two new registers are used:
Control Registers for the Local Ports:
1) local_bigframe_control [7:0] (cpu address 42):
   bit [7]: end_local_bigfm_det. (default=0). When bit[7]=1, the adaptive flow control will also look at local port traffic. When bit[7]=0, the adaptive flow control only monitor exp_rxport traffic if exp_bigfm_control[7]=1.
   bit[6]: Reserved.
   bit[5:3]: Local big frame hit number: Local port need to detect consecutive number of big frames specified by following value local_bigframe_control[7]=1.
      000: Local port need to detect one big frame.
      001: Local port need to detect consecutive two big frames (default).
      010: Local port need to detect consecutive 3 big frames.
      011: Local port need to detect consecutive 4 big frames.
      100: Local port need to detect consecutive 5 big frames.

101: Local port need to detect consecutive 6 big frames.
110: Local port need to detect consecutive 7 big frames.
111: Local port need to detect consecutive 8 big frames.
bit[2:0]: Big frame size selection:
000: Local port bigframe size need to be >=2047.
000: Local port bigframe size need to be >=256.
000: Local port bigframe size need to be >=512.
000: Local port bigframe size need to be >=768.
000: Local port bigframe size need to be >=1024.
000: Local port bigframe size need to be >=1280 (default).
000: Local port bigframe size need to be >=1518.
000: Local port bigframe size need to be >=2047.
*When each local port meet the requirement, it will send a signal "bigfm_det_doneX" to switch.v . X is local port number.

Control Registers for the Expansion Ports:
2) exp_bigframe_control [7:0]: (cpu address 43)
This register determine if the final adaptive flow control signal "lower_total_thresh" should be generated.
We use this lower_total thresh to lower "total" and "individuals" pause level.
bit[7:6]: en_exp_bigfm_det.=1: enable exp_rxport to activate adaptive flow control (default).
00: Disable adaptive flow control.
01: Lower individual (pause, hyst) level when all conditions meet requirement.
10: Lower total (pause, hyst) level when all conditions meet requirement.
11: Lower total (pause, hyst) level when all conditions meet requirement.
bit[5]: Number of local ports detected bigframe if
=0: Need at least 3 local ports detected big frame.
=1: Need at least 5 local ports detected big frame. (default)
bit[4]: exp_rxport auto_bigfm_sz_sel
=1: exp_rxport will use the frame size it detected from exp_rxport to be big frame size.
=0: exp_rxport's big frame size will be determined by local_bigframe_control [2:0]
bit[3:0]: exp_bigfm_num_thresh. Exp_rxport need to detect this number of big frame in one frame time.
000: 8 big frames.
001: 9 big frames.
010: 10 big frames.
011: 11 big frames.
100: 12 big frames.
101: 13 big frames.
110: 14 big frames.
111: 15 big frames.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What we claim:

1. A method of controlling data flow within a network device, said method comprising the steps of:
receiving a data packet into a network device;
snooping the data packet before the data packet is stored in a memory buffer of the network device to determine a packet size based upon a number of bits within the data packet;
aggregating the data packet to a total number of data packets within a burst if the packet size exceeds a predetermined packet size; and
lowering a threshold of the memory buffer to a reset threshold if the total number of data packets exceeds a predetermined number of consecutive data packets.

2. The method as recited in claim 1, wherein the network device comprises a multiple-linked chip device.

3. The method as recited in claim 1, wherein the step of snooping includes snooping the data packet received at an input port.

4. The method as recited in claim 1, wherein the step of snooping includes snooping the data packet received at an expansion port.

5. The method as recited in claim 1, wherein the step of snooping includes snooping the data packet received at an input port and an expansion port.

6. A device for controlling data flow within a network device, said device comprising:
a snooping module contained within a network device and configured to snoop a data packet before the data packet is stored in a memory buffer of the network device to determine a packet size based upon a number of bits within the data packet;
a counter connected to the snooping module, wherein the counter adds the data packet to a total number of data packets within a burst if the packet size exceeds a predetermined packet size; and
a threshold lowering module connected to receive instructions from the snooping module and configured to lower a threshold of the memory buffer to a reset threshold if the total number of data packets exceeds a predetermined number of consecutive data packets.

7. A device as recited in claim 6, wherein the network device comprises a multiple-linked chip device.

8. The device as recited in claim 6, wherein the snooping module is configured to snoop the data packet received at an input port.

9. The device as recited in claim 6, wherein the snooping module is configured to snoop the data packet received at an expansion port.

10. The device as recited in claim 6, wherein the snooping module is configured to snoop the data packet received at an input port and an expansion port.

11. A device for controlling data flow within a network device, said device comprising:
receiving means for receiving a data packet into a network device;
snooping means contained within the network device for snooping a data packet before the data packet is stored in a memory buffer of the network device to determine a packet size based upon a number of bits within the data packet;
aggregating means included within the snooping means for aggregating the data packet to a total number of data packets within a burst if the packet size exceeds a predetermined packet size; and
threshold reset means connected to receive instructions from the snooping means for lowering a threshold of the memory buffer to a reset threshold if the total number of data packets exceeds a predetermined number of consecutive data packets.

12. The device as recited in claim 11, wherein the network device comprises a multiple-linked chip device.

13. The device as recited in claim 11, wherein the snooping means snoops the data packet received at an input port.

14. The device as recited in claim 11, wherein the snooping means snoops the data packet received at an expansion port.

15. The device as recited in claim 11, wherein the snooping means snoops the data packet received at an input port and an expansion port.

16. A method of controlling data flow within a multiple-linked chip device, said method comprising the steps of:
   receiving a data packet into a multiple-linked chip device;
   snooping data packets before the data packets are stored in a memory buffer of the multiple-linked chip device to determine a packet size based upon a number of bits within the data packets;
   aggregating the data packets to a total number of data packets within a burst if the data packet size exceed a predetermined packet size; and
   lowering a threshold of the memory buffer to a reset threshold if the total number of data packets exceeds a predetermined number of consecutive data packets.

17. The method as recited in claim 16, wherein the reset threshold is preprogrammed.

18. The method as recited in claim 16, wherein the reset threshold is automatically determined based upon a capacity of data packets currently stored in the memory buffer.

19. A device for controlling data flow within a multiple-linked chip device, said device comprising:
   a receiving module for receiving a data flow within a multiple linked chip device;
   a snooping module contained within the multiple-linked chip device and configured to snoop data packets before the data packets are stored in a memory buffer of the network device to determine a packet size based upon a number of bits within the data packets;
   a counter included within the snooping module, wherein the counter adds the data packets to a total number of data packets within a burst if the packet size exceeds a predetermined packet size; and
   a threshold lowering module connected to receive instructions from the snooping module and configured to lower a threshold of the memory buffer to a reset threshold if the total number of data packets exceeds a predetermined number of consecutive data packets.

20. The device as recited in claim 19, wherein the reset threshold is preprogrammed.

21. The device as recited in claim 19, wherein the reset threshold is automatically determined based upon a capacity of data packets currently stored in the memory buffer.

22. A device for controlling data flow within a multiple-linked chip device, said device comprising:
   snooping means contained within the multiple-linked chip device for snooping data packets before the data packets are stored in a memory buffer of the multiple-linked chip device to determine a packet size;
   aggregating means included within the snooping module for aggregating the data packets to a total number of data packets within a burst if the data packet size exceed a predetermined packet size; and
   threshold reset means connected to receive instructions from the snooping module for lowering a threshold of the memory buffer to a reset threshold if the total number of data packets exceeds a predetermined number of consecutive data packets.

23. The device as recited in claim 22, wherein the reset threshold is preprogrammed.

24. The device as recited in claim 22, wherein the reset threshold is automatically determined based upon a capacity of data packets currently stored in the memory buffer.

* * * * *